No. 709,483. Patented Sept. 23, 1902.
J. C. HAINES.
TIRE AND FASTENER FOR VEHICLE WHEELS.
(Application filed Mar. 10, 1902.)
(No Model.)
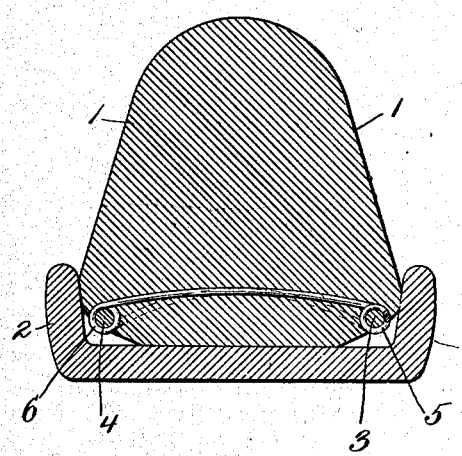
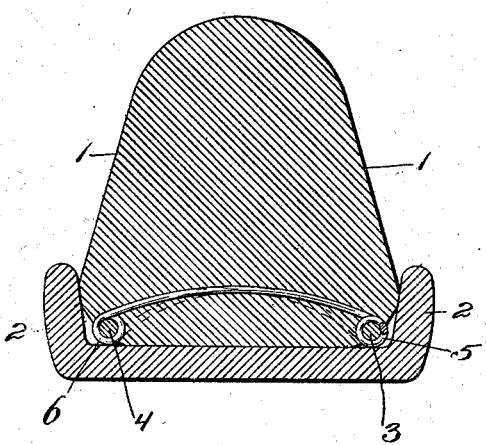
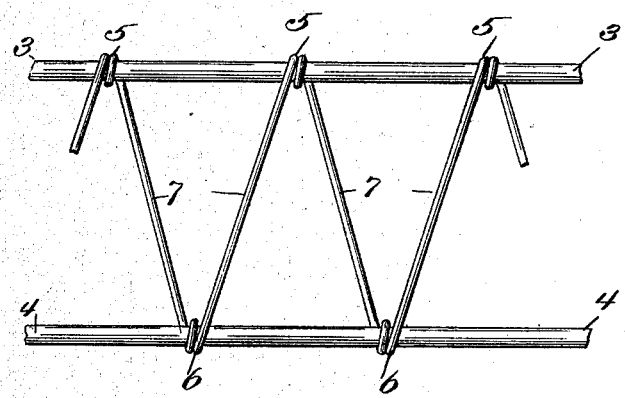
Witnesses
Ray White
Harry B. White
Inventor
Jacques C. Haines
By Foree Bain Atty.

UNITED STATES PATENT OFFICE.

JACQUES C. HAINES, OF CHICAGO, ILLINOIS, ASSIGNOR OF TWO-THIRDS TO WILLIAM E. HUBER AND CHESTER HAINES, OF CHICAGO, ILLINOIS.

TIRE AND FASTENER FOR VEHICLE-WHEELS.

SPECIFICATION forming part of Letters Patent No. 709,483, dated September 23, 1902.

Application filed March 10, 1902. Serial No. 97,392. (No model.)

*To all whom it may concern:*

Be it known that I, JACQUES C. HAINES, of Chicago, in the county of Cook and State of Illinois, have invented certain new and useful Improvements in Tires and Fasteners for Vehicle-Wheels; and I hereby declare that the following is a full, clear, and exact description thereof, reference being had to the accompanying drawings, which form part of this specification.

My invention relates to tires and fasteners for vehicle-wheels.

The object of my invention is to provide a means for securely fastening the tire upon the rim of the vehicle.

Another object of my invention is to overcome the objections to tires and fastenings with which they are associated which have heretofore existed.

The specific object of my invention is to provide a means by which a resilient rubber or other such tire may be securely and easily fixed to the rim of a vehicle-wheel.

In carrying my invention into effect I provide a series of closed eyelets which are stronger than and preferably joined together by a flexible structure, the said eyelets projecting from the surface of the rubber structure near the edges and close to the inside diameter of the tire, the eyelets being preferably placed around the inner circumference of the tire, on each side thereof, in alternate consecutive positions, the eyelets on the respective sides in the preferred structure being joined in sequence by diagonally-placed connecting-wires, the entire series of eyelets being preferably formed of a single wire, the structure when completed being longitudinally elastic.

The accompanying drawings illustrate one means by which my invention may be carried into effect, in which—

Figure 1 is a section of the tire and rim as it will appear before the binding-wires are secured in position for holding the tire in place. Fig. 2 is a similar section showing the parts as they will appear after the binding-wires have been finally secured by welding or brazing together for the purpose of holding the tire in its place in the rim. Fig. 3 shows the eyelets and connecting structure before they are placed into the rubber structure, and it also shows the binding-wires as they pass through the eyelets.

In all of the views the same numerals indicate similar parts.

1 represents an ordinary rubber tire.

2 is a rim adapted to be placed around the wheel in which the tire is contained.

3 and 4 are the binding-wires, which are to be passed through the eyelets before the tire is placed in position, as shown in Fig. 1, and which are to be drawn up tight and soldered or brazed together, so that they will occupy the positions shown in Fig. 2, practically circumferentially parallel with the inner surface of the rim 2.

The eyelets 5 5 and 6 6 are constructed of a single piece of wire 7. The structure including the eyelets is made of a single piece of wire by passing the same completely one or more times successively around each of two parallel binding wires or rods 3 and 4. Every alternate crossing wire in constructing the eyelets passes over the top of the rods 3 and 4, and the intermediate alternate crossing wires pass under the bottom of the rods 3 and 4, as clearly shown in the figures. It is convenient for mechanical reasons to make this structure with the wires 7 parallel, with the eyelets on each side practically in contact with each other, and after the structure has been completed it may be elongated, so that the eyelets 5 5 and 6 6 may be separated any convenient distance. The structure is elastic and is embedded in the tire at the time when the tire is made. Therefore it does not interfere with or limit the circumferential resilience or elasticity of the tire.

The wire 7 may be composed of any suitable or desirable material, and the eyelets 5 5 and 6 6 may be placed any suitable distance apart, according to the number of eyelets desired on either side of a tire of a given length.

It will be noticed in Fig. 1 that there is considerable space between the eyelets 5 5 and 6 6 and the bottom surface of the channel of the rim 2. When the binding-wires 3 and 4 are drawn taut and either welded or brazed together, the eyelets 5 5 and 6 6 are drawn down practically into contact with the inner surface of the rim. The rubber contained between the eyelets 5 and 6 on either side of the rim is thereby somewhat condensed. The wire 7 is shown to be under a greater strain in Fig. 2 than in Fig. 1, as shown by the radius of the arc described by wire 7 in the respective figures.

By virtue of the resilience of the rubber contained between the eyelets on the respective sides and also by virtue of the resilience of the wires 7 the binding-wires 3 and 4 and the eyelets 5 5 and 6 6 will be undisturbed by any pressure that may be applied to the external periphery of the tire 1 as a result of the elasticity described. The compression of the rubber contained between the respective series of eyelets and the resilience of the connecting-wires 7 will accommodate any variation of pressure that may be applied to the tire without removing the eyelets from their position.

It will be noticed that the eyelets cannot be pulled out laterally from the mass in which they are embedded, and, furthermore, that they are stronger than the single connecting-wire and that they present considerable surface resistance by virtue of the connecting-wires 7 being embedded in the mass in which they are contained, so that the strain is distributed over a larger surface, and thereby fracture of the tire structure is avoided.

Another advantage of my invention consists in exposing free open eyelets to receive the tension-wires 3 and 4. They do not fill up with debris, as holes do that are made into the rubber itself. The eyelets may be easily threaded with the tension-wires without the necessity of special tools for this purpose.

I have described the eyelets as projecting from the tire. They may project entirely from the tire or only partially, as shown. The matter of degree to which they project may be modified, as described. The preferred form is that shown in the drawings, in which they project sufficiently to be self-cleaning and to a degree in which a groove only is necessary between the consecutive eyelets in the tire to contain the respective binding-wires, so that the groove may also be self-cleaning. It is also desirable to place the series of eyelets at uniform concentric points beyond the inner surface of the tire and to taper the tire uniformly from the bottom of the eyelets to the center of the transverse section of the tire, so as to produce a stress upon the encompassed rubber between the structure joining the eyelets and the surface of the rim after the eyelets have been drawn down to place by the binding-wires.

Another feature of my invention heretofore referred to consists in drawing the eyelets down, by means of the binding-wires, into direct contact with the bottom of the rim, and thereby compressing the rubber contained in the tire between the eyelets in the respective sides, so as to prevent the bodily movement of the eyelets when pressure is applied to the periphery of the tire.

Having described my invention, what I claim as new and useful, and desire to secure by Letters Patent of the United States, is—

1. A tire-fastener comprising a channel-rim, an elastic tire within the channel of said rim, a series of fastening members partially embedded in the tire and projecting therefrom, adapted to be brought into contact with the bottom surface of said rim, and binding-wires engaging and adapted to draw said projecting portions into contact with the bottom surface of said rim.

2. A tire-fastener comprising a channel-rim, an elastic tire within the channel of said rim, a series of fastening members partially embedded in the tire and projecting therefrom, the projecting portion of larger cross-section than the embedded portion, and binding-wires engaging and adapted to draw said projecting portions into contact with the bottom surface of said rim.

3. A tire-fastener comprising a channel-rim, an elastic tire within the channel of said rim, a series of fastening members partially embedded in the tire and projecting from each side thereof, and binding-wires engaging and adapted to draw said projecting portions into contact with the bottom surface of said rim.

4. A tire-fastener comprising a channel-rim, an elastic tire within the channel of said rim, a series of fastening members partially embedded in the tire and projecting from each side thereof, a circumferentially-elastic structure embedded in said tire joining the two series of fastening members, and binding-wires engaging and adapted to draw said projecting portions into contact with the bottom surface of said rim.

5. A tire-fastener comprising a channel-rim, an elastic tire within the channel of said rim, a series of fastening members formed of a single wire partially embedded in said tire, projecting from each side of said tire, the projecting portions of larger cross-section than the embedded portions, and binding-wires engaging and adapted to draw said projecting portions into contact with the bottom surface of said rim.

6. A tire-fastener comprising a channel-rim, an elastic tire tapered gradually and outwardly toward each side from its transverse center, within said rim, a series of fastening members projecting from each side of said tire near the outside terminations of said tapered portions, and binding-wires engaging and adapted to draw said projecting portions into contact with the bottom surface of said rim and thereby compress that portion of the tire contained between said series of fastenings.

7. A tire-fastener comprising a series of fastening members attached at each side of the tire between its largest and smallest diameters, a resilient tire gradually tapered outwardly toward both sides from its smallest diameter at its transverse center, a channel-rim upon which said tire is mounted, and binding-wires adapted to draw the fastenings into contact with the bottom surface of the said rim.

8. A tire-fastener comprising a series of fastening members attached at each side of the tire between its largest and smallest diameters, a resilient tire gradually tapered outwardly toward both sides from its smallest diameter at its transverse center, a channel-rim upon which said tire is mounted, binding-wires adapted to draw the fastenings into contact with the bottom surface of the said rim, and transverse connections between said fastenings, embedded in the tire adapted to compress the tire between the respective fastenings when said fastenings have been drawn to their respective positions by said binding-wires.

In testimony that I claim the foregoing as my own I affix my signature in presence of two witnesses.

JACQUES C. HAINES.

Witnesses:
FORÉE BAIN,
MARY F. ALLEN.